(12) United States Patent
Yamaguchi

(10) Patent No.: US 10,022,803 B2
(45) Date of Patent: Jul. 17, 2018

(54) CUTTING INSERT HAVING CONSTANT-WIDTH WIPER SURFACE AND CUTTING TOOL

(71) Applicant: TUNGALOY CORPORATION, Iwaki-shi, Fukushima (JP)

(72) Inventor: Takashi Yamaguchi, Iwaki (JP)

(73) Assignee: TUNGALOY CORPORATION, Iwaki-Shi, Fukushima (JP)

( * ) Notice: Subject to any disclaimer, the term of this patent is extended or adjusted under 35 U.S.C. 154(b) by 181 days.

(21) Appl. No.: 15/300,893

(22) PCT Filed: Apr. 21, 2015

(86) PCT No.: PCT/JP2015/062134
§ 371 (c)(1),
(2) Date: Sep. 30, 2016

(87) PCT Pub. No.: WO2015/163326
PCT Pub. Date: Oct. 29, 2015

(65) Prior Publication Data
US 2017/0014914 A1    Jan. 19, 2017

(30) Foreign Application Priority Data
Apr. 22, 2014 (JP) .................. 2014-088138

(51) Int. Cl.
B23C 5/20 (2006.01)
B23B 27/14 (2006.01)

(52) U.S. Cl.
CPC .......... B23B 27/145 (2013.01); B23B 27/14 (2013.01); B23C 5/20 (2013.01);
(Continued)

(58) Field of Classification Search
CPC .......... B23C 2200/12; B23C 2200/162; B23C 2200/167; B23C 2200/164;
(Continued)

(56) References Cited

U.S. PATENT DOCUMENTS 3,289,271 A    12/1966  Stier
4,297,058 A *  10/1981  Armbrust ............. B23B 27/145
                                                        407/113
(Continued)

FOREIGN PATENT DOCUMENTS

JP    2004-216510 A    8/2004
JP    2006-075913 A    3/2006
JP    2011-110634 A    6/2011

OTHER PUBLICATIONS

International Search Report dated Jul. 7, 2015 issued in counterpart International (PCT) Application (No. PCT/JP2015/062134).
(Continued)

*Primary Examiner* — Will Fridie, Jr.
(74) *Attorney, Agent, or Firm* — Studebaker & Brackett PC

(57) ABSTRACT

An indexable cutting insert has opposing first and second polygonal end surfaces (2, 3) connected by a peripheral side surface (4). Sets of cutting edges (5) are formed at the intersection of each end surface with the peripheral side surface. Each set of cutting edges includes a corner cutting edge (6), first and second cutting edges (7), (8) on opposite sides of the corner cutting edge (6) and a wiper edge (9) formed between the second cutting edge (8) and the corner cutting edge (6). The peripheral side surface (14) includes a wiper-edge side surface (14) having constant width as it extends between the first and second end surfaces (2, 3). A boundary of the wiper-edge side surface (14) with a second side surface below the second cutting edge (8) is inclined
(Continued)

with respect to a direction perpendicular to the first end surface.

21 Claims, 8 Drawing Sheets

(52) U.S. Cl.
CPC . *B23B 2200/0409* (2013.01); *B23B 2200/202* (2013.01); *B23B 2200/208* (2013.01)

(58) Field of Classification Search
CPC .......... B23C 2210/247; B23C 2210/24; B23C 2210/241; B23B 2200/12; B23B 2200/123; B23B 2200/125; B23B 2200/36

See application file for complete search history.

(56) References Cited

U.S. PATENT DOCUMENTS

| | | | | |
|---|---|---|---|---|
| 4,840,518 A | * | 6/1989 | Plutschuck | ........... B23B 27/145 407/113 |
| 5,383,750 A | * | 1/1995 | Satran | ................... B23C 5/1072 407/113 |
| 5,466,097 A | * | 11/1995 | Wallstrom | .............. B23C 5/207 407/113 |
| 5,876,154 A | * | 3/1999 | Enderle | ................. B23B 27/141 407/113 |
| 5,951,214 A | | 9/1999 | Rothballer et al. | |
| 8,177,460 B2 | * | 5/2012 | Satran | ................... B23C 5/2213 407/113 |
| 2006/0228179 A1 | | 10/2006 | Alm et al. | |
| 2007/0160433 A1 | | 7/2007 | Lee et al. | |
| 2010/0322732 A1 | * | 12/2010 | Mergenthaler | ........ B23B 51/048 408/229 |
| 2012/0301234 A1 | * | 11/2012 | Yamaguchi | ........... B23B 51/048 407/100 |
| 2013/0108383 A1 | * | 5/2013 | Scheicher | ............. B23B 27/145 407/113 |
| 2013/0129430 A1 | | 5/2013 | Bhagath et al. | |
| 2014/0199127 A1 | * | 7/2014 | Imai | ........................ B23C 5/202 407/42 |
| 2014/0341660 A1 | * | 11/2014 | Cheon | ........................ B23C 5/06 407/42 |
| 2015/0117970 A1 | * | 4/2015 | Daub | ........................ B23C 5/06 407/42 |
| 2018/0065194 A1 | * | 3/2018 | Shibata | ................. B23C 5/2221 |

OTHER PUBLICATIONS

Written Opinion dated Jul. 7, 2015 issued in counterpart International (PCT) Application (No. PCT/JP2015/062134).

* cited by examiner

CUTTING INSERT HAVING CONSTANT-WIDTH WIPER SURFACE AND CUTTING TOOL

RELATED APPLICATIONS

This is a 371 US National Phase of International Patent Application No. PCT/JP2015/062134 filed Apr. 21, 2015 and published as WO 2015/163326A1 on Oct. 29, 2015, which claims priority to JP 2014-088138, filed Apr. 22, 2014. The contents of the aforementioned applications are incorporated by reference in their entirety.

TECHNICAL FIELD

The present invention relates to a cutting insert removably mounted on a cutting tool and used for cutting metallic materials and the like, and also relates to a cutting tool.

BACKGROUND ART

Patent Document 1 describes an example of conventional cutting inserts. Specifically, the cutting insert in Patent Document 1 is a cutting insert comprising two end surfaces whose contour shapes are each substantially polygonal and a peripheral side surface extending between the these end surfaces, wherein cutting edges are formed in an intersecting edge between each of the end surfaces and the peripheral side surface. The cutting edges comprise corner cutting edges, main cutting edges and wiper edges. However, Patent Document 1 does not particularly include any description concerning an intersection angle between the two end surfaces and the peripheral side surface. With reference to the figures of the same document, as viewed from a direction facing the side surface part of the main cutting edge, the boundary between the side surface of a wiper edge and the side surface of the main cutting edge extends in a direction perpendicular to the two end surfaces, which suggests that such cutting insert is of a negative type.

CITATION LIST

Patent Document

Patent Document 1: JP2004-216510 A

SUMMARY

Technical Problem

A negative-type cutting insert has a problem of having a high cutting resistance compared with a positive-type cutting insert. It should be noted that a positive-type cutting insert refers to a cutting insert, a peripheral side surface of which is gradually inclined inward, heading away from one of the end surfaces. Meanwhile, a positive-type cutting insert has a problem of low economic efficiency because, if a peripheral side surface thereof is formed so as to be gradually inclined inward, heading away from one of the end surfaces, such one end surface alone is provided with cutting edges. Further, a positive-type cutting insert has sharper cutting edges than those of a negative-type cutting insert, resulting in a problem in that fracture is prone to occur. In particular, as in Patent Document 1, with regard to a configuration of providing wiper edges as a means for enhancing the surface roughness of a finished surface of a workpiece, such wiper edges should be discussed in terms of a structure in which fracture does not easily occur.

An object of the present invention is to provide a cutting insert which has a reduced cutting resistance, as in a positive-type cutting insert, and which does not easily fracture, in consideration of the arrangement of wiper edges.

Solution to Problem

A cutting insert according to the present invention comprises a first end surface (2) whose contour shape is substantially polygonal, a second end surface (3) opposing the first end surface (2), and a peripheral side surface (4) extending between these end surfaces (2, 3), wherein: a cutting edge (5) is formed at least in part of an intersecting edge between the first end surface (2) and the peripheral side surface (4); the cutting edge (5) comprises a corner cutting edge (6), a first cutting edge (7), a second cutting edge (8) formed on the opposite side of the first cutting edge (7) with respect to the corner cutting edge (6), and a wiper edge (9) formed between the second cutting edge (8) and the corner cutting edge (6); and in the peripheral side surface (4), when regarding a side surface part leading to the wiper edge (9) as a wiper-edge side surface (14), a side surface part leading to the second cutting edge (8) as a side surface (13) and a direction perpendicular to the second cutting edge (8) as a direction V as viewed from a direction facing the first end surface (2), in a side view in the direction V, a boundary of the wiper-edge side surface (14) which is close to the second side surface (13) is inclined in a direction perpendicular to the first end surface (2).

The present invention also resides in a cutting tool comprising the above-mentioned cutting insert.

Advantageous Effects of Invention

In the cutting insert of the present invention, in the side view from the direction V perpendicular to the second cutting edge, the wiper-edge side surface extends in the direction inclined with respect to the direction perpendicular to the end surface, whereby the width of the wiper-edge side surface can be made constant from the first end surface to the second end surface. Thus, in a cutting insert in which both the end surfaces are provided with cutting edges and which can be used also by using the reverse side, the same length and shape of the wiper edges can be achieved between the upper surface and the lower surface, which can result in obtaining a cutting insert which has a low cutting resistance and which does not easily fracture when the wiper edges of any of the end surfaces are used, as well as a cutting tool comprising such cutting insert.

DESCRIPTION OF EMBODIMENTS

Figure 1:
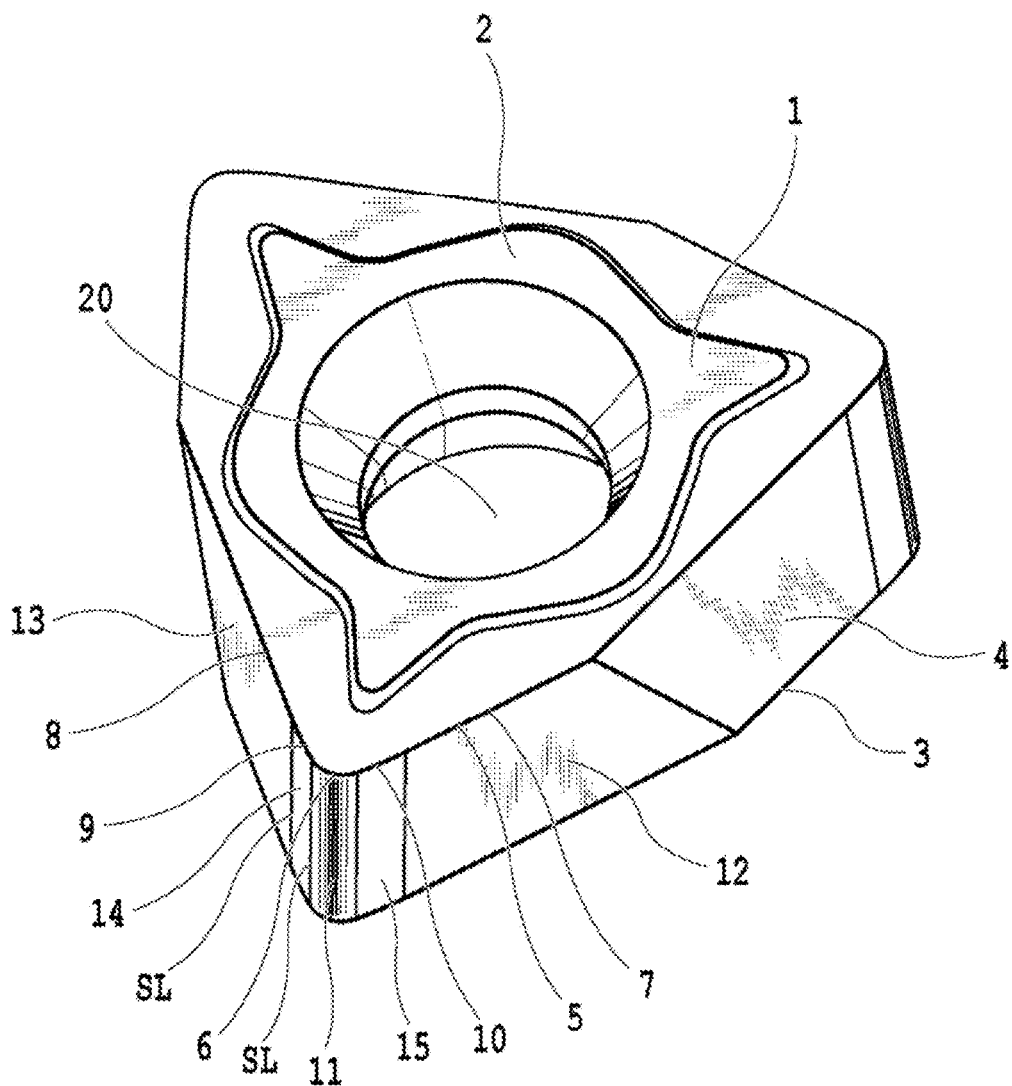
FIG. 1 is a perspective view of a cutting insert according to a first embodiment.
Figure 2:
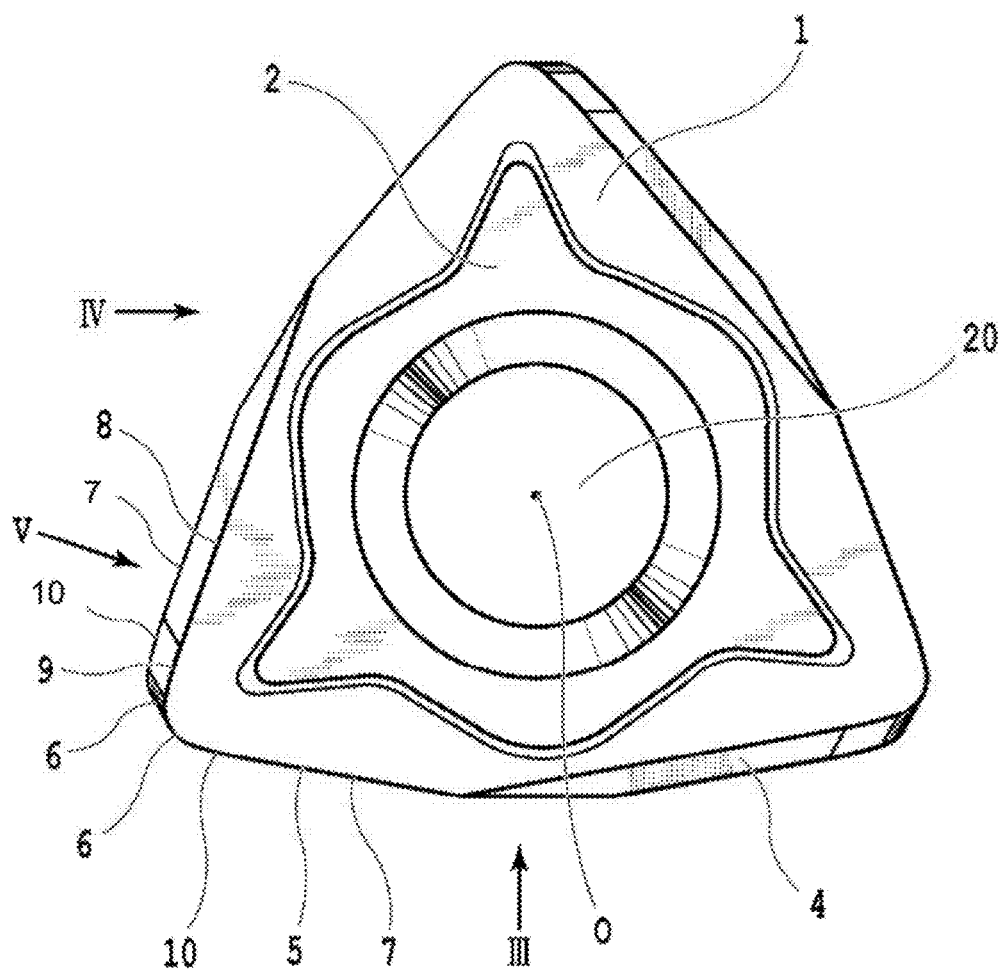
FIG. 2 is a plan view of the cutting insert shown in FIG. 1.
Figure 3:
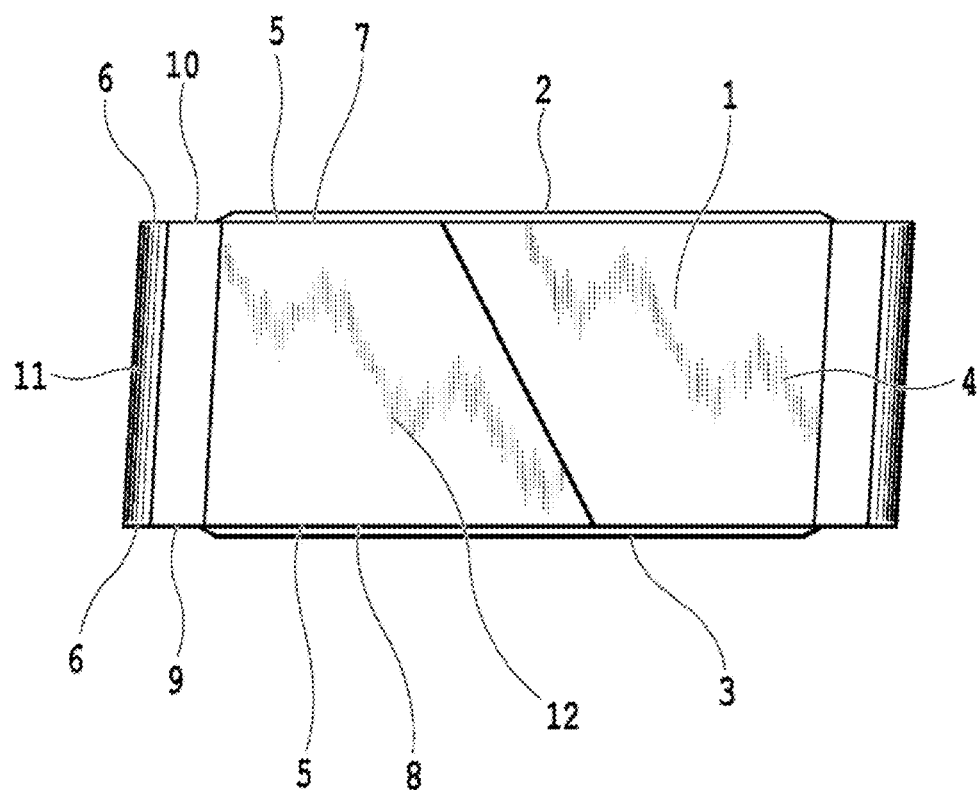
FIG. 3 is a front view of the cutting insert shown in FIG. 1, the view seen from the direction of an arrow III in FIG. 2.
Figure 4:
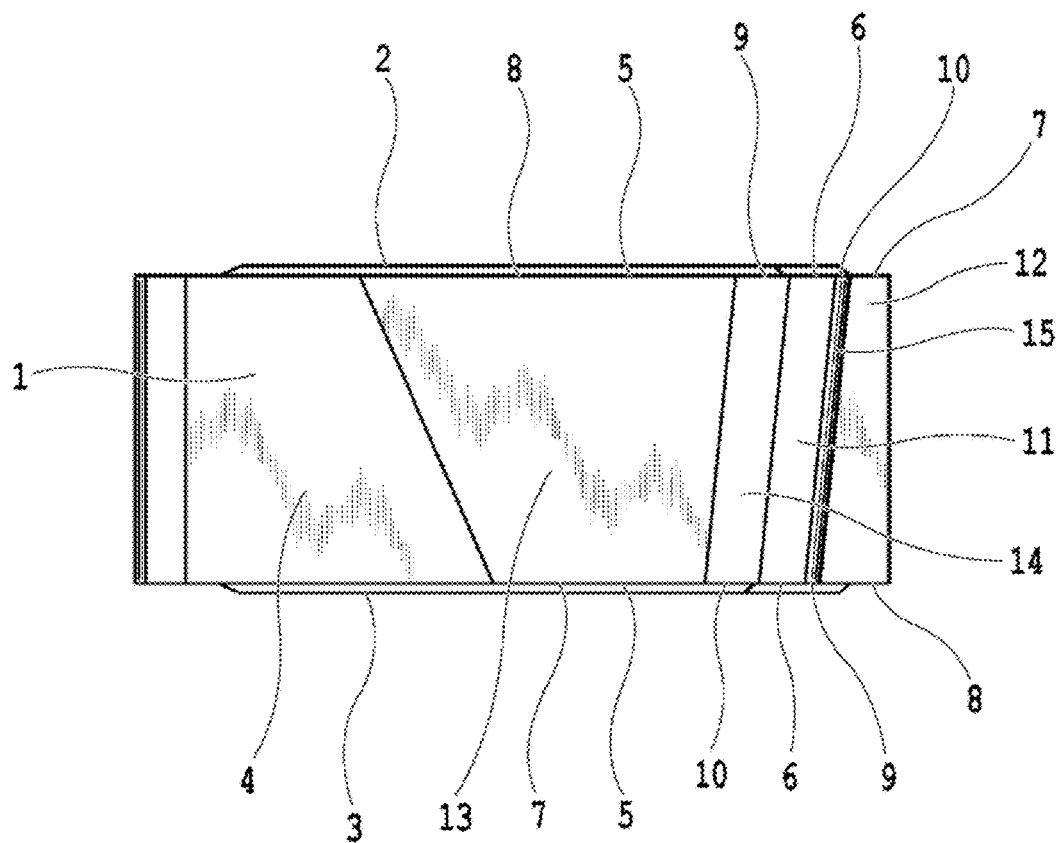
FIG. 4 is a left side view of the cutting insert shown in FIG. 1, the view seen from the direction of an arrow IV in FIG. 2.

Embodiments according to the present invention will now be described with reference to the attached drawings. As shown in FIGS. 1 and 2, a cutting insert 1 of the present embodiment has a substantially hexagonal plate shape and also comprises a hole 20 which penetrates two opposing end surfaces 2, 3 each having a substantially hexagonal shape. The hole 20 is brought into contact with a clamping member, such as a fastening screw or a lever, when the cutting insert 1 is mounted on a cutting tool. The hole 20 is also referred to as a clamping hole.

As shown in FIGS. 1-4, the cutting insert 1 comprises a peripheral side surface 4 extending between the two end surfaces 2, 3. Herein, the two end surfaces 2 and 3, which each have a substantially hexagonal shape, are referred to as a first end surface 2 and a second end surface 3, respectively. When the cutting insert 1 is mounted on a cutting tool, the first end surface 2 or the second end surface 3 serves as a rake surface while the other end surface serves as a seating surface. Cutting edges 5 are formed at least in part of an intersecting edge between the end surface 2 or 3 serving as such rake surface and the peripheral side surface 4.

The cutting insert 1 of the present embodiment is provided with the cutting edges 5 throughout the intersecting edge between the peripheral side surface 4 and each of the first and second end surfaces 2, 3 and has a shape of substantially 120 degrees rotational symmetry with respect to the central axis O of the hole. Therefore, after loosening the clamping member, each time this cutting insert 1 is rotated by 120 degrees around the central axis O of the hole, the cutting insert 1 is then mounted on a cutting tool, whereby the cutting insert 1 can be used three times per end surface. Further, in the cutting insert 1 of the present embodiment, the cutting edges 5 are formed in the intersecting edge between each of the first and second end surfaces 2, 3 and the peripheral side surface 4, and thus, either of the first and second end surfaces 2, 3 may serve as a rake surface. Therefore, the cutting insert 1 has a shape of substantially 180 degrees rotational symmetry relative to a reversing direction. Accordingly, this cutting insert 1 can be used three times for the back surface by being reversed, and can therefore be used six times in total. That is, the cutting insert 1 is economical from the point of comprising a large number of available cutting edges 5.

For the purposes of simplification, the below description will be made only for the case where the first end surface 2 acts as a rake surface. From among the three sets of cutting edges 5 formed in the first end surface 2, only one set of a cutting edge 5 will be described. Specifically, only the cutting edge 5 regarding the lower left corner in FIG. 2 will be described. The description of the other cutting edges 5 will be omitted. In other words, in FIG. 2, the description of the two sets of cutting edges 5 regarding the upper and lower right corners and the three sets of cutting edges 5 formed in the second end surface 3 serving as the back surface will be omitted. The reference numerals attached to the components in the figures are shown in a simplified manner. However, some of the cutting edges 5 which are formed in the second end surface 3 and which are required for description are denoted by the same reference numeral as that for the cutting edges 5 of the first end surface 2. As described above, these six cutting edges 5 serve, in turn, as working cutting edges, and the mounting of the cutting insert 1 on a cutting tool is repeated, so that the cutting insert 1 can be used six times in total.

The first end surface 2 and the second end surface 3 are hereinafter referred to as an upper surface 2 and a lower surface 3, respectively. Although the terms indicating the direction in a space, such as the upper surface 2, are used in order to aid in easier understanding of the description, such terms are used for the sake of convenience and are not intended to define the absolute directions and positional relationships in the space. Unless specifically stated otherwise, the same applies to the terms indicating the directions and positional relationships in other spaces.

The cutting edges 5 formed in the upper surface 2 each comprise a corner cutting edge 6, which is formed at each of the three corners among the corners of the substantially polygonal shape (substantially hexagonal shape), a first cutting edge 7, a second cutting edge 8 and a wiper edge 9. The second cutting edge 8 is formed on the side opposite to the first cutting edge 7 with respect to the corner cutting edge 6. The wiper edge 9 is formed between the second cutting edge 8 and the corner cutting edge 6. This cutting insert 1 works as a right-hand cutting insert 1 when being mounted on a right-hand turning tool. Specifically, the cutting insert 1 is mounted so that the first cutting edge 7 mainly performs cutting of the outer periphery of a workpiece and that the wiper edge 9 performs finishing of such outer periphery. The first and second cutting edges 7, 8 of this cutting insert 1 are comprised of the line cutting edges 5. The first cutting edge 7 and the second cutting edge 8 are arranged so as to form an included angle of about 80 degrees as viewed from a direction facing the upper surface 2. With the arrangement involving such included angle, this cutting insert 1 is easy to use since, in lathing, it is compatible with both outer-periphery cutting and end-surface cutting.

The dimension of the inscribed circle of the hexagon of each of the upper surface 2 and the lower surface 3 of this cutting insert 1 is about 9.5 mm. The thickness of the cutting insert 1 is about 5 mm. However, such dimensions are not limited thereto. The size and thickness of the cutting insert 1 are selected as appropriate in accordance with the shape of the workpiece and the cutting conditions. The rake surface is preferably provided with a chip breaker. Such chip breaker can employ a wide variety of known chip-breaker shapes. The cutting insert 1 of the present embodiment is provided with a chip breaker for both finishing and light cutting.

Figure 6A:
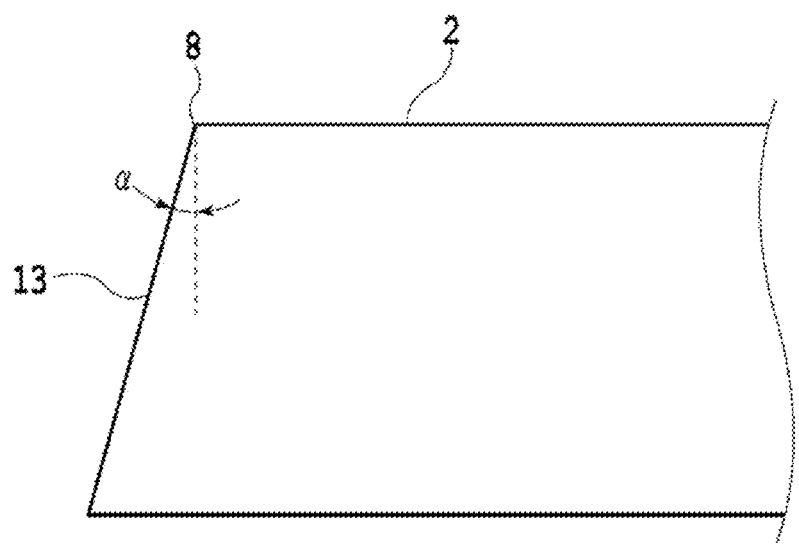
FIG. 6A is a side view schematically showing the relationship between a second cutting edge and a flank with regard to the cutting insert alone in FIG. 1.
Figure 6B:
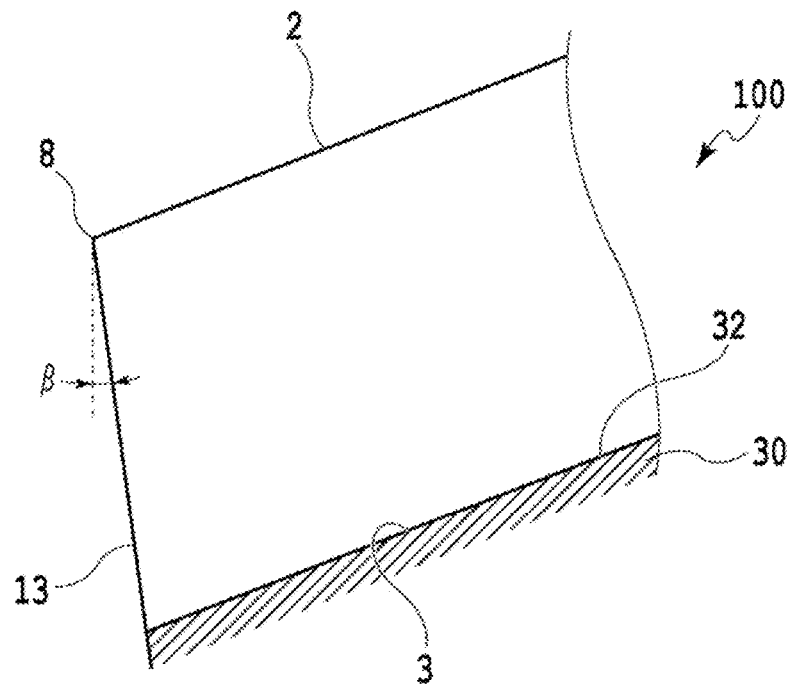
FIG. 6B is a side view schematically showing the relationship between a second cutting edge and a flank when seeing the cutting insert shown in FIG. 1 having a posture when being mounted on a tool body so as to configure a cutting tool.

Herein, in the peripheral side surface 4, a side surface part leading to the corner cutting edge 6 is referred to as a corner side surface 11. In other words, a side surface part between the corner cutting edge 6 of the upper surface 2 and the corner cutting edge 6 of the lower surface 3 is referred to as the corner side surface 11. Similarly, a side surface part leading to the first cutting edge 7 is referred to as a first side surface 12. A side surface part leading to the second cutting edge 8 is referred to as a second side surface 13. A side surface part leading to the wiper edge 9 is referred to as a wiper-edge side surface 14. As described below, the second side surface 13 of the cutting insert 1 is formed such that the flank of the second cutting edge 8 is at a negative clearance angle α, as schematically shown in FIG. 6A, with regard to the cutting insert 1 alone. However, as schematically shown in FIG. 6B, when this cutting insert 1 is mounted onto an insert seat 32 of a cutting tool 30 so as to configure a cutting tool 100, the cutting insert 1 is arranged such that the upper surface 2 is inclined so as to ensure that the second side surface 13, being the flank of the second cutting edge 8, forms an appropriate positive clearance angle β.

In a precise sense, the included angle between the first cutting edge 7 and the second cutting edge 8 is adjusted in the same manner. Specifically, in order to achieve a true included angle of about 80 degrees when the cutting insert 1 is mounted in such inclined manner, the included angle between the first cutting edge 7 and the second cutting edge 8 is adjusted as viewed from the direction facing the upper surface 2 with regard to the cutting insert 1 alone. It should be noted that the included angle is not limited to 80 degrees. The included angle between the first cutting edge 7 and the second cutting edge 8 can be changed as appropriate in accordance with the shape of the workpiece, the cutting conditions, etc. The cutting insert 1 of the present embodiment is a right-hand cutting insert but is not limited thereto. A left-hand cutting insert 1 may also be formed so as to have a shape of mirror symmetry with respect to the above cutting insert 1.

The second side surface 13 is arranged so as to have a relationship of 180 degrees rotational symmetry with respect to the first side surface 12 in the direction in which the cutting insert 1 is reversed. In other words, the second side surface 13 serves as a side surface part having substantially the same function as that of the first side surface 12 when the cutting insert 1 is reversed so as to switch working cutting edges 5. As described above, the second side surface 13 is formed such that the flank of the second cutting edge 8 is at a negative clearance angle α with regard to the cutting insert 1 alone. Accordingly, the first side surface 12 is formed such that the flank of the first cutting edge 7 is at a positive clearance angle with regard to the cutting insert 1 alone. To put it another way, the first side surface 12 is inclined so as to make an acute inner angle relative to the upper surface 2. In other words, the side surface 12 of the cutting insert 1 is gradually inclined inward, heading away from the upper surface 2. The second side surface 13 is gradually inclined outward, heading away from the upper surface 2.

When the first cutting edge 7 serves as a working cutting edge for outer-periphery cutting, the cutting insert 1 is mounted on a cutting tool such that the upper surface 2 is inclined, as described above. Thus, the upper surface 2 is inclined so as to achieve a positive rake angle with the rake surface of the first cutting edge 7. A rake angle resulting from the chip breaker is added to such positive rake angle, whereby a large rake angle is achieved with the rake surface of the first cutting edge 7, and as a result, cutting resistance can be greatly reduced. Cutting resistance can further be reduced compared with a positive-type cutting insert of the prior art. Therefore, chatter vibration can be prevented and a tool life can be greatly extended.

The clearance angle with regard to the cutting insert 1 alone and the true clearance angle when the cutting insert 1 is mounted on a cutting tool are adjusted appropriately. Such true clearance angle when the cutting insert 1 is mounted on a cutting tool is preferably within a range of 5 degrees or more and 7 degrees or less. Further, the angle formed by the side surface 12 and the upper surface 2 preferably forms an inner angle within a range of 65 degrees or more and 87 degrees or less with regard to the cutting insert 1 alone. With an angle smaller than such angle, the part near the cutting edge 5 becomes too sharp and fracture will be prone to occur. Conversely, with an angle larger than such angle, the cutting-resistance reduction effect which will be exerted on a negative-type cutting insert will be decreased. In the cutting insert 1 of the present embodiment, the angle formed by the first side surface 12 and the upper surface 2 with regard to the cutting insert 1 alone is approximately 85 degrees.

The cutting insert 1 of the present embodiment is provided with a curved cutting edge 10 between the first cutting edge 7 and the corner cutting edge 6. The flank of the curved cutting edge 10 is formed so as to be at a positive clearance angle with regard to the cutting insert 1 alone. The curved cutting edge 10 can serve as a wiper edge when an end surface is subjected to lathing. The curved cutting edge 10 may hereinafter be referred to as a second wiper edge 10. When the cutting insert 1 is provided with the second wiper edge 10, the wiper edge 9 may be referred to as a first wiper edge 9. The second wiper edge 10 is formed in a substantially circular-arc shape with a large curvature radius when viewed from the direction facing the upper surface 2. The wiper edge 9 is also formed in a substantially circular-arc shape with a large curvature radius as viewed from the direction facing the upper surface 2. The curvature radius of the second wiper edge 10 is approximately equal to the curvature radius of the wiper edge 9. The curvature radius of each of the wiper edge 9 and the second wiper edge 10 of the cutting insert 1 of the present embodiment is about 10 mm. However, the curvature radius is not limited thereto. The shape including the curvature radius, etc., of the wiper edge 9 and the second wiper edge 10 can be adjusted as appropriate in accordance with the required surface roughness of the workpiece, the cutting conditions, etc. Further, when the curved cutting edge 10 is not allowed to serve as a wiper edge, the curved cutting edge 10 can be allowed to cooperate, as part of a main cutting edge, with the first cutting edge 7. Various modifications of the curved cutting edge 10 can be made regarding the degree, shape, etc., of the curve by appropriately adjusting, for example, the twisting relationship between the upper surface 2 and the lower surface 3 (i.e., the displacement between the contour shapes of the upper surface 2 and the lower surface 3 when seen through the direction of the lower surface from the upper surface) in relation to the included angle, etc.

As described above, the side surface part of the wiper edge 9 is referred to as the wiper-edge side surface 14. In other words, the side surface part extending between the wiper edge 9 on the upper surface 2 side and the cutting edge 5 on the lower surface 3 side is referred to as the wiper-edge side surface 14. The wiper-edge side surface 14 of the cutting insert 1 of the present embodiment extends between the wiper edge 9 on the upper surface 2 side and the curved cutting edge 10 on the lower surface 3 side. The wiper-edge side surface 14 may also be referred to as the first wiper-edge side surface 14. The side surface part extending between the wiper edge 9 on the lower surface 3 side and the cutting edge 5 on the upper surface 2 side is referred to as a second wiper-edge side surface 15. The second wiper-edge side surface 15 of the cutting insert 1 of the present embodiment extends between the wiper edge 9 on the lower surface 3 side and the curved cutting edge 10 on the upper surface 2 side. As described above, the curved cutting edge 10 can be allowed to function as the second wiper edge 10. The second wiper-edge side surface 15 is arranged in a relationship of 180 degrees rotational symmetry with respect to the wiper-edge side surface 14. Specifically, when reversing the cutting insert 1 and switching working cutting edges 5, the second wiper-edge side surface 15 serves as a side surface part having substantially the same function as that of the first wiper-edge side surface 14.

Figure 5:
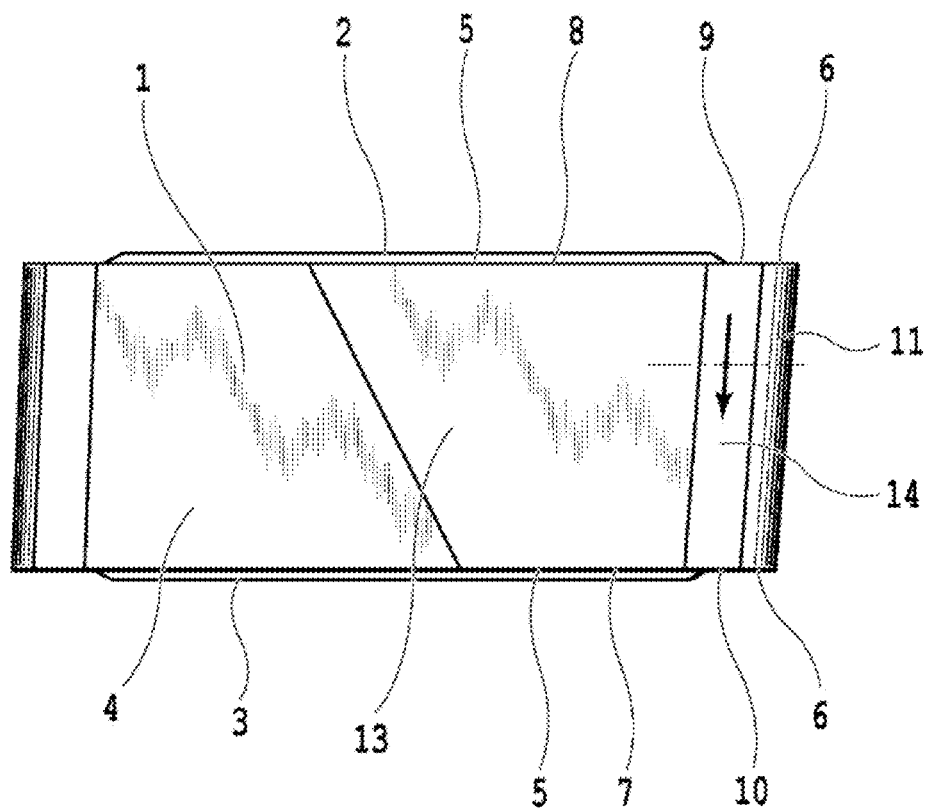
FIG. 5 is a side view of the cutting insert shown in FIG. 1, the view seen from the direction of an arrow V in FIG. 2.

As shown in FIG. 2, a direction perpendicular to the second cutting edge 8 is regarded as a direction V as viewed from the direction facing the upper surface 2. As shown in FIG. 5, in a side view from the direction V, the boundary of the wiper-edge side surface 14 which is close to the second side surface 13 is inclined in a direction perpendicular to the upper surface 2. In other words, the wiper-edge side surface 14 extends in a direction inclined with respect to the direction perpendicular to the upper surface 2. Explaining this with reference to FIG. 5, the wiper-edge side surface 14 extends in a direction of inclination which goes leftward and downward from the upper surface 2 to the lower surface 3. In other words, the wiper-edge side surface 14 is inclined in a direction away, to the opposite side, from the corner side surface, from the upper surface 2 to the lower surface 3. The width of the wiper-edge side surface 14 in FIG. 5 is constant from the upper surface 2 to the lower surface 3.

Figure 7:
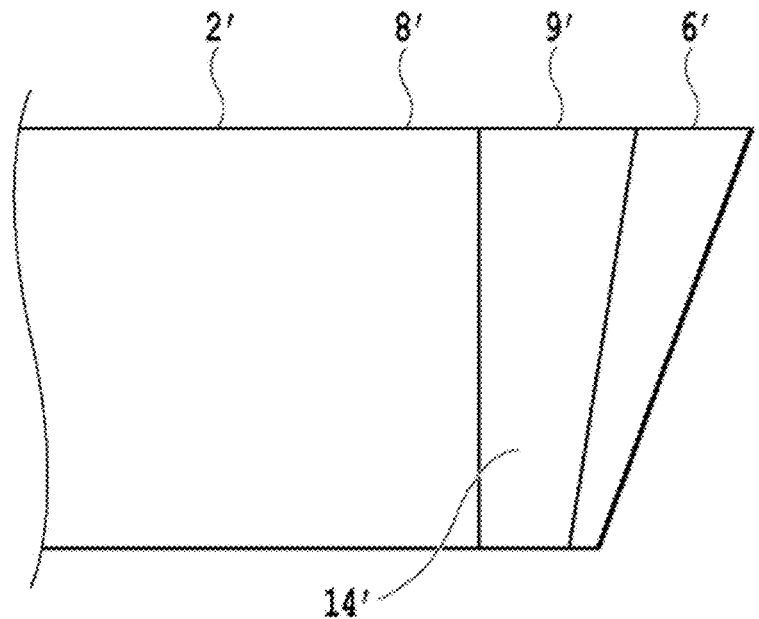
FIG. 7 is a side view schematically showing a side surface part leading to a wiper edge, the side surface part being formed when providing such wiper edge to a conventional cutting insert having a positive clearance angle.

When a conventional cutting insert having a positive clearance angle is provided with wiper edges, the boundary of the side surface of the wiper edge 9' which is on the opposite side with respect to the corner is in a direction perpendicular to the upper surface 2' in the side view schematically shown in FIG. 7 in order to form a constant clearance angle with the peripheral side surface. Since the boundary of the side part of the wiper edge which is close to the corner cutting edge 6' is inclined, the wiper-edge side surface 14' has a narrower width, heading away from the upper surface. Specifically, in the conventional formation method, the wiper-edge side surface 14' is a side surface part having a trapezoidal shape or a circular conical surface shape.

However, when, as in the cutting insert 1 of the present invention, providing both the upper surface 2 and the lower surface 3 with the cutting edges 5, if the wiper-edge side surface 14 is narrow, this is likely to invite a situation in which small circular-arc shaped cutting edge portions or sharp cutting edge portions, etc. appear in the cutting edges 5 of the lower surface 3. It has been confirmed that using such portions as working cutting edges leads to the occurrence of a problem wherein fracture is prone to occur. Meanwhile, in the present embodiment, the wiper-edge side surface 14 is inclined in a direction away, to the opposite side, from the corner side surface, from the upper surface 2 to the lower surface 3, and the horizontal width of the wiper-edge side surface 14 is constant from the upper surface 2 to the lower surface 3. Accordingly, even a cutting insert in which both the upper and lower surfaces are provided with cutting edges and which can be used also by using the reverse side can alleviate the above-described problem of fracture in a cutting edge. Further, in order for the curved cutting edge 10 to serve as the second wiper edge 10, as in the cutting insert 1 of the present embodiment, the contour shape of the wiper edge 9 of the upper surface 2 and the contour shape of the curved cutting edge 10 of the lower surface 3 are preferably the same. Such same shape allows for the same level of surface roughness under the same cutting conditions, and this enables the cutting insert 1 to be easy to use. Accordingly, as for the wiper-edge side surface 14, the contour shape viewed from the direction facing the upper surface 2 and the contour shape viewed from a direction facing the lower surface 3 are preferably the same.

The wiper-edge side surface 14 is gradually inclined outward, heading away from the upper surface 2. In other words, the wiper-edge side surface 14 is formed such that the flank of the wiper edge 9 is at a negative clearance angle with regard to the cutting insert 1 alone. When this cutting insert 1 is mounted on a cutting tool, the cutting insert 1 is arranged such that the upper surface 2 is inclined so as to ensure that the wiper-edge side surface 14, being the flank of the wiper edge 9, forms an appropriate positive clearance angle, as described above. On the other hand, the second wiper-edge side surface 15 is gradually inclined inward, heading away from the upper surface 2. In other words, the second wiper-edge side surface 15 is formed such that the flank of the second wiper edge 10 is at a positive clearance angle with regard to the cutting insert 1 alone.

The sectional shape when the wiper-edge side surface 14 of this cutting insert 1 is cut parallel to the first end surface 2 is constant from the first end surface 2 to the second end surface 3. As described above, in order for the curved cutting edge 10 to serve as the second wiper edge 10, the contour shape of the wiper edge 9 of the upper surface 2 and the contour shape of the curved cutting edge 10 of the lower surface 3 are preferably the same. In other words, as for the sectional shape (cross-sectional shape) when the wiper-edge side surface 14 is cut parallel to the first end surface 2, the cross-sectional shape in the vicinity of the first end surface 2 is preferably the same as the cross-sectional shape in the vicinity of the second end surface 3. The cross-sectional shape of the wiper-edge side surface 14 of the cutting insert 1 of the present embodiment is substantially circular-arc shaped. Since the cutting edges 5 of the cutting insert 1 are formed substantially parallel to the upper surface 2, the contour shape of the wiper edge 9 as viewed from the upper surface 2 is the same as the cross-sectional shape, in the vicinity of the upper surface 2, of the wiper-edge side surface 14. In other words, the basic shape transferred from the wiper edge 9 when a workpiece surface is finished is the sectional shape in the vicinity of the upper surface 2 of the wiper-edge side surface 14. However, in order to facilitate the manufacture of the cutting insert 1, the shape of the cross section (indicated by the dashed line) in the direction perpendicular to the direction (the direction indicated by the arrow in FIG. 5) in which the wiper-edge side surface 14 extends may be circular-arc shaped.

The direction in which the wiper-edge side surface 14 extends may be parallel to the direction in which the corner side surface 11 extends. When the wiper-edge side surface 14 is formed in such manner, the sectional shape when the wiper-edge side surface 14 is cut parallel to the first end surface 2 is substantially elliptical-arc shaped, in a precise sense. The sectional shape of the wiper-edge side surface 14 may be substantially elliptical-arc shaped. Since the wiper-edge side surface 14 has a large radius curvature, even when such sectional shape is elliptical-arc shaped, such elliptical arc can be approximate to a circular arc. The sectional shape of the wiper-edge side surface 14 may be a shape obtained by combining multiple circular arcs or lines. On the other hand, when the radius curvature is increased towards infinity, the wiper-edge side surface 14 is a substantially flat surface. In other words, the sectional shape when the wiper-edge side surface 14 is cut parallel to the first end surface 2 is substantially line shaped. When the wiper-edge side surface 14 is provided as a substantially flat surface, the theoretical surface roughness of the finished surface can be at a minimum. The sectional shape of the wiper-edge side surface 14 may be selected as appropriate from among a substantially line shape, a substantially circular-arc shape, a substantially elliptical-arc shape, a substantially parabolic shape, etc., as well as a shape of any combination from among those shapes, in accordance with the required surface roughness of the workpiece and the cutting conditions.

The wiper-edge side surface 14 of this cutting insert 1 is connected smoothly with the corner side surface 11 and the second side surface 13. Accordingly, although the edge of the wiper-edge side surface 14 which is close to the second side surface 13 is shown by the solid lines in FIGS. 1-6 (denoted by symbol SL in FIG. 1), such edge is not clearly visible in practice. The edge of the wiper-edge side surface 14 which is close to the corner side surface 11 is also not clearly visible in practice. In other words, in FIGS. 1-6, such practically invisible edges are expressed by additionally providing the solid lines in order to conceptually show the wiper-edge side surface 14 and the second wiper-edge side surface 15. Accordingly, there may be a case in which it cannot be confirmed that the edge of the wiper-edge side surface 14 which is close to the second side surface 13 is inclined when viewed only in the direction of the side view of FIG. 5. For example, in the case of this cutting insert 1, it can be confirmed in the side view in the direction V of FIG. 5 that the corner side surface 11 is inclined. Accordingly, when the cutting insert 1 is viewed from a top view, i.e., when the cutting insert 1 is viewed as in the plan view of FIG. 2, it can be confirmed that the edge of the wiper-edge side surface 14 which is close to the second side surface 13 is inclined, as long as the contour shapes of the corner cutting edge 6 and the wiper edge 9 on the upper surface 2 side are respectively the same as the contour shapes of the corner cutting edge 6 and the curved cutting edge 10 on the lower surface 3 side. Alternatively, the contour shape of the upper surface in a top view may be compared with the contour shape of the lower surface in a bottom view so as to confirm that such contour shapes are the same. Alternatively, as for the sectional shape obtained by cutting the wiper-edge side surface 14 parallel to the first end surface 2, it can be confirmed that the edge of the wiper-edge side surface 14 which is close to the second side surface 13 is inclined, as long as it can be confirmed that the sectional shape in the vicinity of the upper surface 2 and the sectional shape in the vicinity of the lower surface 3 are the same.

The width of the wiper-edge side surface 14 is preferably constant from the first end surface 2 to the second end surface 3. The width of the wiper-edge side surface 14 is basically defined as a length in a direction perpendicular to the direction in which the wiper-edge side surface 14 extends (i.e., the direction of inclination of the wiper-edge side surface 14 which is indicated by the arrow in FIG. 5) as viewed from a direction facing the wiper-edge side surface 14. However, the width of the wiper-edge side surface 14 may be defined as a length in a direction parallel to the first end surface 2 as viewed from the direction facing the wiper-edge side surface 14. In a cutting insert in which both the upper and lower surfaces are provided with cutting edges and which can be used also by using the reverse side, it is important for the above width to be constant in order to achieve the same length and shape of the wiper edges between the upper surface and the lower surface, and thus, either of the above-defined widths may be employed. When a design is employed such that the wiper-edge side surface 14 has a constant cross-sectional shape, it is easy for the wiper-edge side surface 14 to be formed with a constant width.

The contour shape of the corner cutting edge 6 can be substantially elliptical-arc shaped as viewed from the direction facing the upper surface 2. When the corner cutting edge 6 is formed in a substantially elliptical-arc shape, the corner cutting edge 6 can be connected smoothly with the wiper edge 9 by appropriately adjusting the contour shape of the corner cutting edge 6. This increases the degree of freedom at which the shape of the wiper edge 9 is adjusted as appropriate in accordance with the shape of the workpiece and the cutting conditions. Similarly, the corner cutting edge 6 can be connected smoothly with the wiper edge 9 by appropriately adjusting the curvature radius of the corner cutting edge 6. However, while the adjustment of the curvature radius of the corner cutting edge 6 increases the degree of freedom for shape adjustment, a decrease in, in particular, the curvature radius is likely to cause fracture from a part of the corner cutting edge 6. In such case, an adjustment may be preferably made by employing a substantially elliptical-arc shape as the contour shape of the corner cutting edge 6 rather than adjusting the curvature radius of the entire corner cutting edge 6.

The lower surface 3 of the cutting insert 1 is brought into contact with a bottom surface of an insert seat when mounting the cutting insert 1 on a cutting tool. The lower surface 3 of the cutting insert 1 is preferably formed as a flat surface. When the lower surface 3 is provided as a flat surface, the bottom surface of the insert seat can also be provided as a flat surface, and this facilitates machining and allows for the insert seat to be formed with high fixing stability. However, the configuration is not limited thereto. The lower surface 3 may have any shape, as long as it can be in contact with the bottom surface of the insert seat so as to fix the cutting insert 1, in particular, as long as the cutting insert 1 can be mounted stably in the state of being inclined in a preferred manner. The same applies to the upper surface 2 of the cutting insert 1, and thus, the description thereof will be omitted.

The peripheral side surface 4 of the cutting insert 1 is brought into contact with a wall surface of the insert seat when the cutting insert 1 is mounted on a cutting tool. The cutting insert 1 of the present embodiment is preferably configured such that, in the peripheral side surface 4, the second side surface 13 can be brought into contact with the wall surface of the insert seat. In other words, the second side surface 13 preferably comprises a contact surface with respect to the insert seat. As described above, the second surface 13 is gradually inclined outward, heading away from the upper surface 2. In other words, the second side surface 13 is inclined so as to form an acute inner angle relative to the lower surface 3. Accordingly, when the second side surface 13 is brought into contact with the wall surface of the insert seat, the cutting insert 1 is held so as to be effectively prevented from floating from the bottom surface of the insert seat. Thus, the cutting insert 1 can be restrained stably, and the cutting insert 1 is therefore prevented from being shifted during cutting. Accordingly, the cutting insert 1 is prevented from suffering abnormal damage such as fracture. The second side surface 13 is preferably formed as a flat surface. When the second side surface 13 is provided as a flat surface, the wall surface of the insert seat can also be provided as a flat surface, and this facilitates machining and allows for the insert seat to be formed with high fixing stability. However, the configuration is not limited thereto. The peripheral side surface 4 may have any shape, as long as it can be brought into contact with the wall surface of the insert seat so as to fix the cutting insert 1.

The cutting insert 1 is firmly fixed to a cutting tool by way of the hole coming into contact with the clamping member, as described above. However, the configuration is not limited thereto. As for a method of mounting the cutting insert 1 on a cutting tool, various known methods are applicable.

The cutting insert 1 of the present embodiment can be manufactured easily by means of pressing and sintering of powder material and the following grinding of the peripheral side surface 4. It should be noted that the method of manufacturing the cutting insert 1 is not limited thereto. The cutting insert 1 may be manufactured merely by means of pressing and sintering of powder material. For example, a manufacturing method employing a split die as a mold for the pressing of powder material is also possible.

Materials used for the cutting edges 5 of the cutting insert 1 and their peripheral areas are selected from a cemented carbide, cermet, ceramic, hard materials such as cubic boron nitride, and materials obtained by applying PVD or CVD coating to the surface of these hard materials. Materials for the parts other than the cutting edges 5 are preferably similar materials, such as hard materials.

The cutting insert and cutting tool of the present invention are not limited to the embodiments described above, and various modifications and additions may be made to the above embodiments without departing from the gist of the present invention. The contour shapes of the upper surface 2 and the lower surface 3 may be defined as appropriate and may each be, for example, substantially rhomboidal shaped.

What is claimed is:

1. A cutting insert (1) comprising a first end surface (2) whose contour shape is substantially polygonal, a second end surface (3) opposing the first end surface (2), and a peripheral side surface (4) extending between these end surfaces (2, 3), wherein:
   a plurality of cutting edges (5) is formed at least in part of an intersecting edge between the first end surface (2) and the peripheral side surface (4);
   the cutting insert is formed so as to be rotationally symmetrical around an axis passing through the first end surface and the second end surface;
   an intersecting edge between the second end surface and the peripheral side surface is also provided with a plurality of cutting edges;
   the cutting insert is formed in a shape of substantially 180 degrees rotational symmetry relative to a reversing direction;
   each of the cutting edges (5) comprises a corner cutting edge (6), a first cutting edge (7), a second cutting edge (8) formed on the opposite side of the first cutting edge (7) with respect to the corner cutting edge (6), and a wiper edge (9) formed between the second cutting edge (8) and the corner cutting edge (6);
   in the peripheral side surface (4), a first side surface (12), which is a side surface part leading to the first cutting edge (7), is gradually inclined inward, heading away from the first end surface (2) to the second end surface side;
   in the peripheral side surface (4), a wiper-edge side surface (14), which is a side surface part leading to the wiper edge (9), is gradually inclined outward, heading away from the first end surface (2) to the second end surface side; and
   as for a sectional shape when the wiper-edge side surface (14) is cut parallel to the first end surface (2), a sectional shape in a vicinity of the first end surface (2) is the same as a sectional shape in a vicinity of the second end surface (3).

2. The cutting insert according to claim 1, wherein, when regarding a side surface part leading to the second cutting edge (8) as a second side surface (13) and a direction perpendicular to the second cutting edge (8) as a direction V as viewed from a direction facing the first end surface (2),
   in a side view in the direction V, a boundary of the wiper-edge side surface (14) which is close to the second side surface (13) is inclined in a direction perpendicular to the first end surface (2).

3. The cutting insert according to claim 1, wherein the wiper-edge side surface (14) is formed in a substantially flat surface shape.

4. The cutting insert according to claim 2, wherein, as for the wiper-edge side surface (14), the sectional shape is formed so as to be substantially circular-arc shaped or substantially elliptical-arc shaped.

5. The cutting insert according to claim 1, wherein the first side surface (12) is inclined so as to make an inner angle within an angle range of 65 degrees or more and 85 degrees or less relative to the first end surface (2).

6. The cutting insert according to claim 1, wherein the second side surface (13), which is the side surface part leading to the second cutting edge (8), is gradually inclined outward, heading away from the first end surface (2) to the second end surface side.

7. The cutting insert according to claim 1, wherein:
   the cutting edge (5) comprises a second wiper edge (10) formed between the first cutting edge (7) and the corner cutting edge (6); and
   in the peripheral side surface (4), when regarding a side surface part leading to the second wiper edge (10) as a second wiper-edge side surface (15),
   the second wiper-edge side surface (15) is gradually inclined inward, heading away from the first end surface (2).

8. The cutting insert according to claim 7, wherein:
   the wiper edge (9) and the second wiper edge (10) are each formed in a substantially circular-arc shape as viewed from the direction facing the first end surface (2); and
   a curvature radius of the second wiper edge (10) is approximately equal to a curvature radius of the wiper edge (9).

9. The cutting insert according to claim 1, wherein a contour shape of the corner cutting edge (6) is substantially elliptical-arc shaped as viewed from the direction facing the first end surface (2).

10. The cutting insert according to claim 1, wherein:
    the second side surface (13), which is the side surface part leading to the second cutting edge (8), comprises a contact surface with respect to an insert seat of a cutting tool; and
    the contact surface is formed as a substantially flat surface.

11. A cutting tool comprising the cutting insert (1) according to claim 1.

12. An indexable cutting insert (1), comprising:
    opposing first and second hexagonal end surfaces (2, 3) connected by a peripheral side surface (4);
    a rotational axis (0) passing through the first and second end surfaces (2, 3), the insert having 120° rotational symmetry about the rotational axis (O);
    first and second peripheral cutting edges formed at intersections of the peripheral side surface (4) with respective first and second surfaces (2, 3), each peripheral cutting edge comprising three sets of cutting edge (5);
    each cutting edge set (5) comprising:
      a corner cutting edge (6);
      a first cutting edge (7) extending on one side of the corner cutting edge (6);
      a second cutting edge (8) extending on a second, opposite side of the corner cutting edge (6); and
      a first wiper edge (9) formed between the second cutting edge (8) and the corner cutting edge (6);

the peripheral side surface (4) associated with each cutting edge set (5) comprising:
- a corner side surface (11) extending from the corner cutting edge (6) towards the opposing end surface; and
- a first side surface (12) extending from the first cutting edge (7) towards the opposing end surface, the first side surface (12) being inclined so as to make an acute inner angle with the first end surface (2) and thereby provide the first cutting edge (7) with a positive insert clearance angle;
- a second side surface (13) extending from the second cutting edge (8) towards the opposing end surface, the second surface (13) being inclined so as to make an obtuse inner angle with the first end surface (2) and thereby provide the second cutting edge (8) with a negative insert clearance angle;
- a corner side surface (11) extending from between the corner cutting edge (6) towards the opposing end surface; and
- a first wiper-edge side surface (14) extending from the first wiper edge (9) towards the opposing end surface, the first wiper-edge side surface (14) being inclined so as to make an obtuse inner angle with the first end surface (2) and thereby provide the first wiper edge (9) with a negative insert clearance angle;
wherein in a peripheral side view of the cutting insert:
- a boundary of the first wiper-edge side surface (14) closest to the second side surface (13) is inclined in a direction with respect to a direction perpendicular to the first end surface (2); and
- a horizontal width of the wiper-edge side surface (14) is constant, from the first end surface (2) to the second end surface (3).

13. The indexable cutting insert (1) according to claim 12, further comprising:
- a second wiper edge (10) formed between the first cutting edge (7) and the corner cutting edge (6); and
- a second wiper-edge side surface (15) extending from the second wiper edge (10) towards the opposing end surface; the second wiper-edge side surface (15) being inclined so as to make an acute inner angle with the first end surface (2) and thereby provide the second wiper edge (10) with a positive insert clearance angle.

14. The indexable cutting insert according to claim 13, wherein:
- as viewed from a direction facing the first end surface (2), the first wiper edge (9) and the second wiper edge (10) are each formed in a substantially circular-arc shape; and
- a curvature radius of the second wiper edge (10) is approximately equal to a curvature radius of the first wiper edge (9).

15. The indexable cutting insert according to claim 12, wherein:
in a horizontal cross-section cut parallel to the first end surface (2), the first wiper-edge side surface (14) has a substantially circular-arc shape or a substantially elliptical-arc shape.

16. The indexable cutting insert according to claim 15, wherein:
in a horizontal cross-section cut parallel to the first end surface (2), a sectional shape of the first wipe-edge side surface (14) in a vicinity of the first end surface (2) is the same as a sectional shape of the first wipe-edge side surface (14) in a vicinity of the second end surface (3).

17. The indexable cutting insert according to claim 12, wherein:
as viewed from a direction facing the first end surface (2), the corner cutting edge (6) has a substantially elliptical-arc shape.

18. The indexable cutting insert according to claim 12, wherein:
the second side surface (13) comprises a substantially flat contact surface for abutment with a wall surface of an insert seat.

19. The indexable cutting insert according to claim 12, wherein:
- the second side surface (13) comprises a substantially flat contact surface for abutment with a wall surface of an insert seat;
- as viewed from a direction facing the first end surface (2), the corner cutting edge (6) has a substantially elliptical-arc shape;
- in a horizontal cross-section cut parallel to the first end surface (2), the first wiper-edge side surface (14) has a substantially circular-arc shape or a substantially elliptical-arc shape; and
- in a horizontal cross-section cut parallel to the first end surface (2), a sectional shape of the first wipe-edge side surface (14) in a vicinity of the first end surface (2) is the same as a sectional shape of the first wipe-edge side surface (14) in a vicinity of the second end surface (3).

20. The indexable cutting insert according to claim 12, wherein:
- in each peripheral edge, the three cutting edge sets (5) are contiguous with one another, with the first cutting edge (7) of one cutting edge set (5) merging with the second cutting edge (8) of an adjacent cutting edge set (5), around said each peripheral edge; and
- in each cutting edge set, (5), the corner cutting edge (6), the first cutting edge (7), the second cutting edge (8), and the first wiper edge (9) are all coplanar.

21. The indexable cutting insert according to claim 12, wherein:
the first and second end surfaces are identical, and the cutting insert is reversible.

* * * * *